Patented Aug. 2, 1949

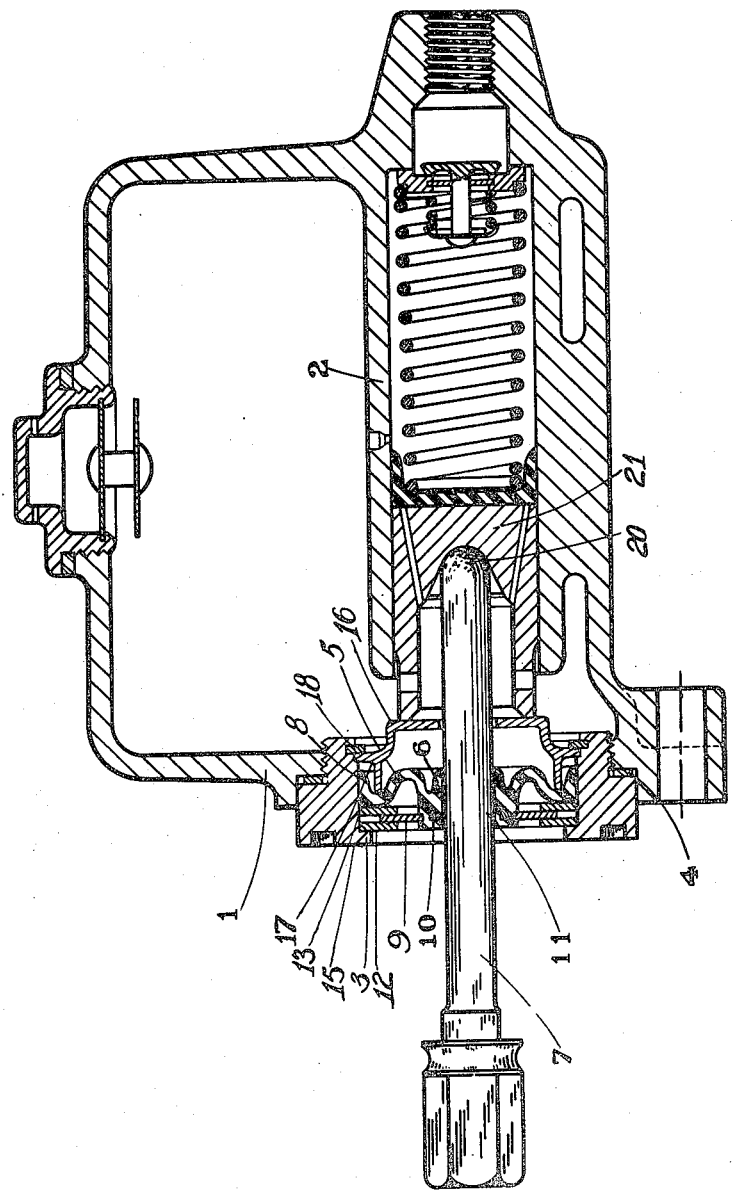

2,477,882

UNITED STATES PATENT OFFICE 2,477,882

MASTER CYLINDER PACKING

Ludger E. La Brie, Detroit, Mich., assignor to Hydraulic Brake Company, Detroit, Mich., a corporation of California Application April 30, 1947, Serial No. 744,813

3 Claims. (Cl. 286—15)

My invention relates to master cylinder packing, and more particularly to a flexible closure for the reservoir and inner end of the master cylinder of a hydraulic brake system, whereby the push rod for the piston may reciprocate feely through the reservoir wall, and may move away from the axis of the piston during the reciprocation of the piston without causing undue wear upon the packing.

Heretofore flexible closures have been used with abutments for preventing the packing from moving inwardly and outwardly with the movement of the push rod while permitting lateral movement of the packing with the wobbling of the push rod, but such prior closures have involved wear between the rubber packing and the abutment.

In accordance with my present invention, a metallic disc is vulcanized within the rubber closure mechanism, the disc being guided between two parallel surfaces to permit lateral movement of the rubber packing, but preventing the packing from moving in and out with the lineal reciprocation of the push rod.

My invention is illustrated in the accompanying drawing which is a sectional elevation of a master cylinder and associated reservoir.

The wall of the reservoir 1 is provided with a threaded opening in alignment with the cylinder 2, and into which a plug 3, forming part of the reservoir housing, is screwed by means of a spanner wrench, against a packing 4. The internal opening through the plug 3 houses a rubber packing 5, formed with a flexible S-shaped corrugation, with a cylindrical portion 6, which closely fits around the push rod 7, at its cylindrical part 11, and with a circumferential flange 8 which contacts the inner circumference of the plug 3. A metallic or other rigid disc 9 is molded into the hub 10 of the rubber packing 5, the disc 9 being provided with holes near its inner edge through which the rubber penetrates to cause a close union between the disc 9 and the rubber of the hub 10. The diameter of the disc 9 is less than the opening through the plug 3, so that the disc and the hub 10 of the packing 5 may move laterally through a considerable distance within the plug 3. A pair of metallic or other rigid washers 12 and 13 lie one on each side of the disc 9 and closely fit within the opening in the plug 3, the opening being provided with a shoulder 15 against which the washer 12 abuts, the washer 13 being held against the disc 9 by the peripheral portion 8 of the rubber packing 5. A retainer cup 16 has a rim 17 which engages the rubber packing opposite the washer 13. A C-spring 18 holds the cup 16 in place and holds the rim of the retainer cup in squeezing contact with the rubber of the packing opposite the washer 13, thus holding the washers 12 and 13 yieldingly against the disc 9 with only such pressure however as to permit the disc 9 freely to move laterally between the plates 12 and 13.

In operation, the reservoir is partly filled with fluid which has access to the interior of the cylinder 2, and also has access to the inner face of the rubber packing 5. The lip 6 of the packing 5 contracts about the push rod 7, thus preventing the fluid from escaping along the push rod as it reciprocates. Usually the external end of the push rod is moved by a pivoted arm, not shown, such that the pivot point moves both above and below the axis of the cylinder as the brakes are applied. When this happens, the inner end 20 of the push rod pivots within the socket in the piston 21, causing the part of the push rod which extends through the packing to move above and below the axis of the cylinder. When this happens, the hub 10 of the rubber packing likewise moves laterally, bending the S-shaped wall of the packing and causing the disc 9 to slide between the washers 12 and 13. The hub of the packing is thus prevented from moving inwardly and outwardly along the push rod, and the rubber of the packing has no frictional engagement with the abutment which could cause wear and disintegration at the point external of the cylinder where lubrication is not readily provided.

Although I have shown and described my invention with respect to certain details, it is to be understood that I do not wish to be unduly limited thereto, certain modifications being possible without departing from the spirit or scope of my invention.

I claim:

1. In a packing, a rod having lineal movement, lateral movement and angular movement in the packing, the packing being of rubber and having a hub sealing against the rod and a corrugated portion surrounding the hub, a stationary support against which the periphery of the packing is sealed, a rigid disc moulded into the hub of the packing in a plane perpendicular to the normal central position of the rod, a pair of washers lying one on each side of the disc having their peripheries carried by the stationary support, the periphery of the rubber packing being pressed against one of said washers yieldingly to hold the washers and disc together and to seal the periphery of the packing against the escape of fluid, the washers and disc serving to hold the hub against lineal movement with the rod, the flexibility between the hub and the disc mounted therein permitting angular movement of the rod with respect to the stationary support.

2. In a packing a wall having an opening therein to be sealed, a rod extending through an opening in the wall, a rubber packing surrounding the rod and closing the opening and having a flexible circumferential corrugation to permit the lateral movement of the rod as it moves off the axis of the opening in the wall during reciprocation, a rigid disc flexibly attached to the packing adjacent the rod and extending in a plane substantially normal to the central position of the rod, a pair of rigid washers lying one on each side of the rigid disc having their peripheries carried by the wall, means for pressing the periphery of the rubber packing against one of said washers yieldably to hold the washers and disc together and to seal the periphery of the packing against the passage of fluid, whereby the rod may be moved lineally, laterally and angularly within the wall opening.

3. In a packing, a plug forming a part of the wall of a fluid chamber and having an opening therethrough, a rod extending through the opening in said plug, a flexible rubber packing yieldingly engaging and surrounding the rod and extending outwardly therefrom to the inner cylindrical wall of the plug, a rigid disc molded into the rubber packing near the opening through which the rod passes, the disc having a peripheral portion lying in a plane perpendicular to the normal axis of the rod, an abutment for the outer side of said disc and an abutment for the inner side of said disc against which abutments the discs may move laterally with the lateral movement of the rod, and means to press the periphery of said flexible rubber packing against the face of the latter abutment yieldingly to hold it against the disc and to seal the packing against the inner circumference of the opening in said plug, the portion of the flexible rubber packing adjacent the rod being yielding within the disc molded into it so that the rod may be deflected angularly in its operation.

LUDGER E. LA BRIE.

REFERENCES CITED

The following references are of record in the file of this patent:

UNITED STATES PATENTS

| Number | Name | Date |
|---|---|---|
| 1,711,206 | Oliver | Apr. 30, 1929 |
| 2,120,922 | Rasmussen | June 14, 1938 |
| 2,202,351 | Loweke | May 28, 1940 |
| 2,219,064 | Boyer et al. | Oct. 22, 1940 |